United States Patent

[11] 3,559,666

| [72] | Inventors | Brooks Walker;<br>Frank W. Kertell, 1280 Columbus Ave.,<br>San Francisco, Calif. 94133 |
|---|---|---|
| [21] | Appl. No. | 853,589 |
| [22] | Filed | Aug. 18, 1969 |
| [45] | Patented | Feb. 2, 1971<br>Continuation of application Ser. No.<br>648,065, June 22, 1967, abandoned. |

[54] GOVERNOR MOUNTED IN A GENERATOR
10 Claims, 2 Drawing Figs.

[52] U.S. Cl.................................................. 137/53,
123/103, 123/117, 123/198, 200/80
[51] Int. Cl....................................................... G05d 13/10
[50] Field of Search..................................... 137/(Inquired)

[56] References Cited
UNITED STATES PATENTS
2,379,945  7/1945  Wyatt.
3,105,222  9/1963  Adler.

*Primary Examiner*—Clarence R. Gordon

ABSTRACT: This invention involves a governor mounted in the pulley of an automotive generator by a very simple adapter to make use of the bearings of the generator to support the governor. The governor has the characteristic of retracting a friction resistant plunger such as teflon at all speeds below a selected speed to be used to operate a valve to control a suction operated motor to actuate fuel shut off above said selected speed at closed throttle or to actuate a suction operated spark advance mechanism or other engine functions requiring a speed sensor.

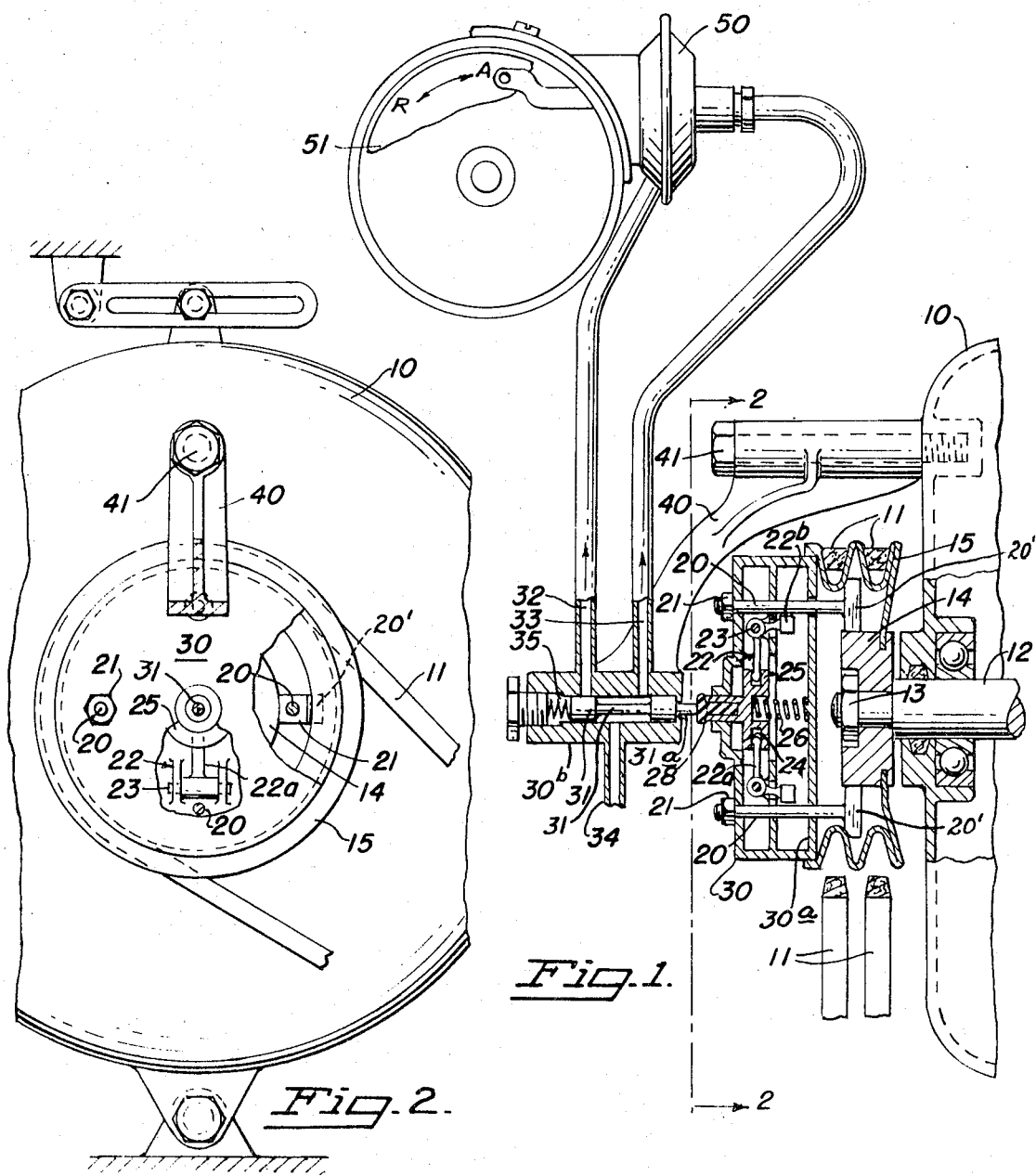

GOVERNOR MOUNTED IN A GENERATOR

This application is a continuation of application Ser. No. 648,065, filed Jun. 22, 1967 and now abandoned.

Other objects of the invention are the type of adapter lugs using the interior contour of the governor drive pulley to support the governor so that such governor can be attached easily to a generator pulley in production in automobiles today.

Another feature is the mounting of the sensor to be actuated by the motion of the governor so that both can be supported by and on said generator and not disturbed by the motion of the generator in moving to tighten the belt that drives the generator.

Another feature is the forming of the governor components to fit inside the generator pulley and move a stem towards and from the generator on the axis of the generator rotor at speeds below a selected speed to actuate a nonrotating element supported by the generator and to retract said stem above said selected speed so that there is no contact or function or very low friction between the rotating governor and the nonrotating portion actuated by the governor at most of the driving speed ranges of a governor of this type when mounted on a motor vehicle engine.

Other objects and advantages will be more particularly pointed out in the accompanying specification and claims.

We have illustrated our invention in the accompanying drawing, in which we have shown:

FIG. 1, a side elevation partly cut away and partly in section and partly diagrammatic, showing one form of the invention.

FIG. 2 shows a plan view of the generator pulley from the side with the governor mounted therein as shown in FIG. 1, but taken at section 2-2.

In these figures we have shown a generator 10 which may be an alternator or generator as used on motor vehicles today. It is driven by a belt or belts 11 from the crank shaft pulleys (not shown) in a conventional manner. On the end of the rotor shaft 12 of the generator is mounted a pulley 15. Pulley 15 is supported by hub 14 and secured to shaft 12 by nut 13 and a key, if necessary, to secure a positive drive. Lug bolts 20 having elongated heads 20' fit in the space between hub 14 and pulley 15 and when turned lock or wedge in place, as shown in FIGS. 1 and 2. Nuts 21 secure housing 30 against plate 30a which nestles inside the flange, if any, at the outside edge of pulley 15.

Bellcranks 22 with weights 22b are pivoted at pins 23. Arms 22a ride in groove 24 of slide element 25 which is urged to the left, as viewed in FIG. 1 by spring 26. Low friction button 28 may be formed of teflon or other suitable low friction material.

Valve 30b is mounted on bracket 40 which is secured to the generator by capscrew 41 (or a stud and nut). This may be a through bolt that helps secure the generator together. Valve plunger 31 is urged to the right, as viewed in FIG. 1, by spring 35 which is lighter than spring 26 so that when the generator speed is above a selected speed, such as 1000 plus or minus, plunger 31 will be all the way to the right, as viewed in FIG. 1, and shoulder 31a will take the force of spring 35 in this position and there will be no force or contact on button 28 as weights 22 will move out against bolts 20 or other suitable stop to hold button 28 all the way to the right, as viewed in FIG. 1. In this position suction from a source such as the intake manifold will enter through tube 34 and be conducted to tube 33 by plunger 31 while plunger 31 closes off tube 32. Tube 33 is connected to the advance side of suction operated spark advance or retard motor 50. Motor 50 actuates be breaker plate 51 to the advance or retard positions. Tube 32 is connected to the retard side of advance and retard motor 50 so that below a selected speed when plunger valve 31c is moved to the left, as viewed in FIG. 1, by weights 22 moving toward the center and spring 26 moves plunger 31 to the left. In this position plunger 31 will connect tube 34 to tube 32 and to the retard side of motor 50 to provide suction operated retard at idle. The governor as described will provide suction actuated advance at cruises and decelerations above said selected speeds. At low speeds valve 31c off suction to advance line 33 and a bleed slot will bleed line 33.

The same governor can operate a switch or valve in series with a closed throttle sensor to control a fuel shut off at high speed closed throttle decelerations somewhat like the circuit shown in U.S. Pat. No. 3,251,352 dated May 17, 1966, entitled "Delayed Ignition Shut Off After Engine Stops."

I have illustrated my inventions in these various ways; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

We claim:

1. A speed responsive device comprising a pulley having a hub with a radially outwardly facing surface and a rim having a radial surface and an axial flange with a radially inwardly facing surface, a speed governor having a housing and a stem extending therefrom for reciprocating movement in response to the speed of rotation of the governor, and means engaged with the housing and pulley for securing the housing in engagement with the radial surface and said inwardly facing surface, and with the stem in axial alignment with the axis of rotation of the pulley.

2. A device as defined in claim 1 wherein the rim is V-shaped and the axial flange extends from a leg of the V and the radial surface is the surface of said leg.

3. A device as defined in claim 2 wherein the securing means comprises circumferentially spaced rods having a head at one end, each head having one dimension less than the distance between the bight of the V and the hub and another dimension greater than the distance between the bight of the V and the hub, whereby the heads can be inserted between the space between the bight of the V and hub and then rotated to lock or wedge the rods to the pulley.

4. A speed governor controlled valve comprising a generator having a housing pivotally mounted on a support, an armature shaft rotatably mounted in the housing, and a pulley having a hub mounted on the shaft, said pulley having a rim with a radial surface and an axial flange with a radially inwardly facing surface; a speed governor having a housing and a stem extending therefrom for reciprocating movement in response to the speed of rotation of the governor, and means engaged with the governor housing and pulley for securing said housing in engagement with the radial surface and inwardly facing surface, and with the stem in axial alignment with the axis of rotation of the pulley.

5. A device as defined in claim 4 further including a valve housing having an inlet and outlet port mounted on the generator housing, a valve in said valve housing and means on said valve for engagement with the stem for shifting the valve to control the flow of fluid through the ports.

6. A device as defined in claim 5 further including a biasing means in said valve housing urging the valve toward the stem, a biasing means of greater force than the first mentioned biasing means in the governor housing urging the stem toward the valve, and centrifugal weights in the governor housing and in engagement with the stem for urging the stem away from the valve on a predetermined speed of rotation.

7. A mechanical operator comprising a generator having a housing pivotally mounted on a support, an armature shaft rotatably mounted in the housing, a pulley mounted on the shaft for connection to a source of power to drive the said shaft, and a speed responsive governor mounted on the pulley, said governor having an operating stem axially movable along the axis of the shaft in response to the speed thereof.

8. A device as defined in claim 7 further including a driven member for engagement and disengagement by said stem and means responsive to a preselected minimum speed of rotation of the pulley for urging the operating stem into driving engagement with the driven member, and means responsive to a speed greater than said minimum for disengaging the stem and driven member.

9. A device as defined in claim 8 wherein the driven member is a valve and a valve housing mounting said valve for reciprocation therein in axial alignment with the operating stem.

10. A device as defined in claim 9 wherein said housing has a fluid supply port and an inlet and outlet port for selective connection to the supply port by the valve.